United States Patent [19]

Gounon et al.

[11] Patent Number: 5,757,314
[45] Date of Patent: May 26, 1998

[54] METHOD AND APPARATUS FOR ACCURATELY DETERMINING THE POSITION OF A MASKED POINT BY SATELLITE

[75] Inventors: René-Pierre Gounon, Chateau-Thebaud; Michel-Francis Priou, Saint Julien de Concelles, both of France

[73] Assignee: Dassault Sercel Navigation-Positionnement, France

[21] Appl. No.: 660,533

[22] Filed: Jun. 6, 1996

[30] Foreign Application Priority Data

Jun. 6, 1995 [FR] France ................................ 95 06646

[51] Int. Cl.⁶ ............................... H04B 7/185; G01S 5/02
[52] U.S. Cl. ............................................................ 342/357
[58] Field of Search ....................... 342/357; 364/449.7, 364/449.9; 701/213

[56] References Cited

U.S. PATENT DOCUMENTS

| | | | |
|---|---|---|---|
| 5,153,598 | 10/1992 | Alves, Jr. | |
| 5,379,045 | 1/1995 | Gilbert et al. | |
| 5,452,211 | 9/1995 | Kyrtsos et al. | 342/357 |
| 5,572,218 | 11/1996 | Cohen et al. | 315/357 |

FOREIGN PATENT DOCUMENTS

| | | |
|---|---|---|
| A-0 420 338 | 4/1991 | European Pat. Off. |
| A-0 481 307 | 4/1992 | European Pat. Off. |
| A-0 588 598 | 3/1994 | European Pat. Off. |
| WO-A-90 00718 | 1/1990 | WIPO |
| WO-A-90 00719 | 1/1990 | WIPO |

OTHER PUBLICATIONS

"Real Time Flight Testing Using Integrity Beacons for GPS Category III Precision Landing" Clark Cohen et al., Navigation: Journal of the Institute of Navigation, vol. 41, No. 2, Summer 1994, pp. 145–157.

"Integrity Monitoring for Precision Approach Using Kinematic GPS and a Ground Based Pseudolite", Boris Pervan et al., Navigation: Journal of the Institute of Navigation, vol. 41, No. 2, Summer 1994, pp. 159–174.

*Primary Examiner*—Theodore M. Blum
*Attorney, Agent, or Firm*—Blakely Sokoloff Taylor & Zafman

[57] ABSTRACT

In the proposed method of radio satellite localization of points on the surface of the earth:

- a pseudolite transmitter (1) is placed on a masked point (P);
- the antenna (3) of radio localization means (2) is placed successively in a plurality of arbitrary points ($P_i$) where reception of the signals transmitted by the satellite is satisfactory, and the phase of the signal transmitted by the pseudolite transmitter (1) and received by the antenna at said points is measured; and
- the coordinates of the masked point (P) is determined as a function of said measurements and as a function of the coordinates of the points ($P_i$).

The apparatus includes a pseudolite transmitter (1) and a radio localization mobile receiver (2) having one of its channels allocated to receiving the signal ($S_p$) transmitted by the pseudolite transmitter (1).

12 Claims, 1 Drawing Sheet

METHOD AND APPARATUS FOR ACCURATELY DETERMINING THE POSITION OF A MASKED POINT BY SATELLITE

BACKGROUND OF THE INVENTION

The present invention relates to methods and systems for satellite radio localization of points on the surface of the earth.

Over the last ten years, the use of radio signals transmitted by satellites has found a vast field of applications concerning navigation, geodesics, and topography.

Specifically, the global positioning system (GPS) is now used worldwide, and makes it possible to obtain, in real time, centimeter accuracy for determining the positions of points on the surface of the globe. Such great accuracy is essential for topographers in numerous terrestrial positioning applications.

The techniques implemented for reaching this result are said to be "real-time-kinematic" techniques. They have been used since 1993–94 and they are illustrated in particular in the Applicants' French patent filed under the number 94/00523.

For a general description of such techniques, reference may also be made to the following publication "GPS Vermessung mit Real-Time-Kinematic Technische Untersicht" [GPS surveying with the real-time-kinematic sighting technique], Verwendungen & Technische Angaben, B 1–7, Trimble, 1993.

With these techniques, it is possible, provided only that signals can be received simultaneously from at least five satellites, to produce high quality work and to achieve fixing accuracies of the order of one centimeter when measuring or setting points. Consequently, in numerous applications, satellite radio locating techniques have replaced earlier locating techniques that made use of optical instruments for measuring angles or distances (distance meters and tachymeters).

Nevertheless, some points on the ground are not always sufficiently clear or suitably situated to enable satellite signals to be received properly. This constitutes a brake on the development of satellite radio localization techniques, and in particular on their use by topographers for ordinary everyday work.

This limitation can clearly be seen when it applies to determining the position of a point that is under plant cover, or that is at the foot of a wall, or that is under a bridge or a hopper, and more generally, that is in an environment that is relatively unsuited to proper reception of satellite signals.

So far, the solution provided for this type of situation consists in determining, with all the required accuracy, the coordinates of one or more "intermediate" points situated in clear surroundings close to a masked target point, and then in using conventional techniques for measuring angles and distances (surveyors' chain, tachymeter, distance meter, etc.) to situate the target point relative to the intermediate points.

This combination of different techniques gives rise to a large amount of equipment, to procedures that are complex, and to considerable risks of error; in practice, it greatly limits the advantage of using satellite techniques, since in any event conventional techniques and the associated equipment remain essential in very many applications.

An object of the invention is to increase considerably the field in which radio satellite techniques can be applied. To this end, the invention provides a method and a system of radio localization based on using satellite signals, and enabling the accurate positions of masked points to be found even when reception of radio satellite signals at said points is impossible or inadequate.

SUMMARY OF THE INVENTION

According to the method of the invention:

the antenna of a radio localization mobile receiver capable of moving freely in the vicinity of the masked point is positioned on a plurality of arbitrary points where the signals transmitted by the satellites are received satisfactorily;

the coordinates of said points are determined by radio localization; and the coordinates of the masked point are determined as a function of said coordinates;

the method being characterized in that, for this purpose, a pseudolite transmitter is placed at the masked point;

at each of the points where the mobile receiver antenna is successively positioned, the phase of the signal transmitted by the pseudolite transmitter and received at said points by said antenna is measured; and the coordinates of the masked point are determined as a function of said measurements and as a function of the coordinates of said points.

Thus, according to the invention, use is made of phase measurements of the signal transmitted by the pseudolite transmitter and of the satellite measurements enabling successive positions of the localizing mobile receiver to be computed, thereby enabling the coordinates of the masked point to be computed.

DESCRIPTION OF THE PREFERRED EMBODIMENTS

Figure 1:
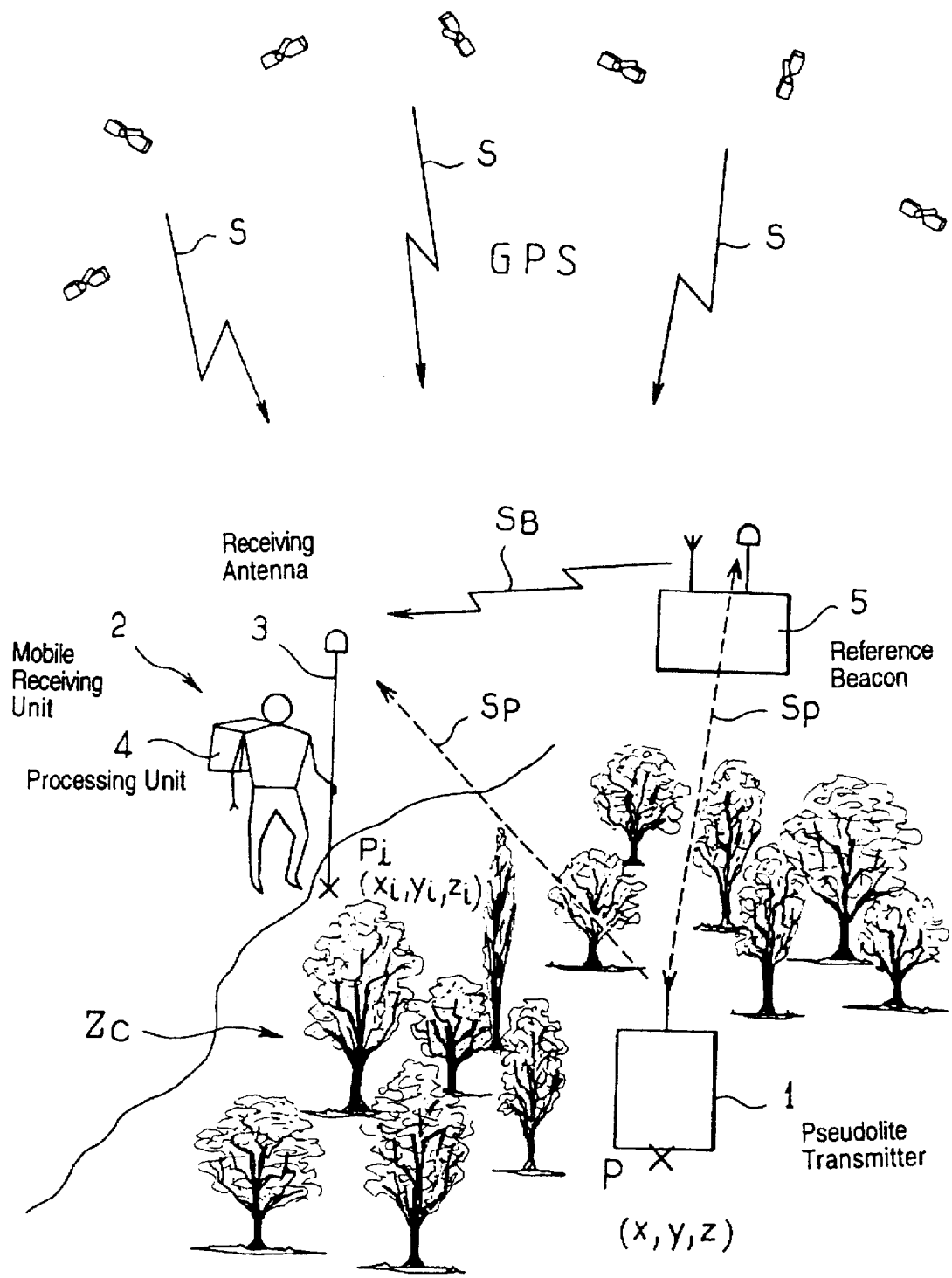
FIG. 1 illustrates an exemplary embodiment of the invention.

The term "pseudolite" or "pseudo-satellite" is used to mean a ground transmitter unit which transits encoded pseudo-random radio signals analogous to those emitted by satellites in the radio localization system used (satellites in the NAVSTAR constellation for GPS systems).

Pseudolites are conventionally known to the person skilled in the art.

They are mainly used in aviation for guiding aircraft relative to landing ground or for removing absolute phase ambiguities.

In this respect, reference may advantageously be made to the following patents: U.S. Pat. No. 5,177,489 and U.S. Pat. No. 5,311,194, and to the following publications:

Real time flight testing using integrity beacons for GPS, category III precision landing, Clark Cohen et al., Revue Navigation, Vol. 41, No. 2, Summer 94-Institute of Navigation; and Integrity monitoring for precision approach using kinematic GPS and a ground-based pseudolite, Boris Pervan et al., Revue Navigation, Vol. 41, No. 2, Summer 94.

In particular, in an advantageous variant of the method of the invention:

for each point where the antenna is successively positioned, the parameters are determined of a linear equation relating the coordinates of the masked point and the phase shift between the pseudolite transmitter and the radio localization mobile receiver at a reference time, said parameters being a function of the phase measurement of the pseudolite signal and of the coordinates of said points; and the coordinates of the masked point are determined by solving the system of linear equations obtained in this way.

The invention also provides apparatus including a pseudolite transmitter for placing at a point to be localized where reception of the signals transmitted by satellites is insufficient, one of the channels of the radio localization means that would normally be dedicated to receiving radio satellite signals, being allocated for receiving the signal transmitted by the pseudolite transmitter, said apparatus including processing means for determining the coordinates of the point to be localized as a function of measuring the phase of the signal transmitted by the pseudolite transmitter at various points where the antenna is successively positioned and as a function of the coordinates of said points as determined by the unit.

Other characteristics and advantages appear further from the following description. This description is purely illustrative and non-limiting. It should be read with reference to the sole accompanying figure which is a diagram showing the principle on which the method of the system of the invention is based.

The figure shows a masked point P whose coordinates are to be found, which point is situated in a sheltered zone $Z_C$ in which radio satellite signals S are not properly received.

The apparatus used for measuring the coordinates XYZ of the point P include a pseudolite transmitter 1 and a GPS radio localization mobile receiver 2.

The pseudolite 1 radiates at very low power (a few microwatts) at the GPS frequency of 1.57542 GHz (L1), or at a frequency slightly different therefrom, and its radiated signal $S_P$ is phase modulated by a pseudo-random code of the same format as GPS codes.

The mobile receiver 2 has a reception antenna 3 mounted on a pole held by the operator and a processing unit 4 carried by the operator and connected to said antenna 3.

The unit 4 processes the radio signals as received by the antenna 3 from GPS satellites, from the pseudolite 1, and from a reference beacon 5 which also receives the signals from the GPS satellites and which retransmits phase difference correction signals (signals $S_B$ in the figure).

As will have been understood, one of the channels of the radio localization mobile receiver 2 that is normally dedicated to receiving satellite radio signals is allocated to receiving the signal $S_P$ transmitted by the pseudolite 1, such that a phase measurement which is a function of the distance between the pseudolite transmitter 1 and the mobile receiver as constituted by the mobile receiver 2 is made available to the processing unit 4.

The processing performed by the unit 4 on the GPS signals is kinematic processing in real time so that the position of the antenna is known with centimeter accuracy. Such processing may, for example, be processing of the type described in the French patent application filed by the present Applicants under the number 94/00523, to which reference may advantageously be made.

The operator moves the antenna 3 of the mobile receiver 2 over a succession of points $P_i$ where the radio satellite signals S are suitably received.

At each of the various points $P_i$, the receiver 2 determines the coordinates $X_i$, $Y_i$, and $Z_i$ of the point $P_i$ at which it is located, and it performs a phase measurement $R_i$ on the signal transmitted by the pseudolite 1 and received by the GPS receiver 2.

A knowledge of the coordinates of at least four points $P_i$ and of the corresponding phase measurements $R_i$ enables the unit 4 to determine the X, Y and Z coordinates of the point P.

The processing implemented for this purpose by the unit 4 is explained below.

At a point $P_0$ of coordinates $X_0$, $Y_0$, and $Z_0$, the phase measurement is:

$$R_0 = D_0 + H_0$$

where $D_0$ is a phase value proportional to the distance between the pseudolite 1 and the receiver 2 and where $H_0$ is the phase difference between the clocks of the pseudolite 1 and of the receiver 2.

At a later time $T_1$, the operator has moved to a point $P_1$ of coordinates $X_1$, $Y_1$, and $Z_1$, and the phase measurement performed by the receiver 2 is as follows:

$$R_1 = D_1 + H_0 + \Delta H_1$$

where $D_1$ is the new value of phase corresponding to the distance between the pseudolite 1 and the receiver 2, and where $\Delta H_1$ is the relative slip between the clocks of the receiver 2 and of the pseudolite 1 that has occurred between times $T_0$ and $T_1$.

At a time $T_2$, the operator has moved to a point $P_2$ of coordinates $X_2$, $Y_2$, and $Z_2$. The phase measurement performed is as follows:

$$R_2 = D_2 + \Delta H_0 + H_1 + \Delta H_2$$

where $D_2$ is the phase corresponding to the distance between the receiver 2 at said point P2 and the pseudolite 1, and where $\Delta H_2$ is the relative slip between the clocks of the receiver 2 and the pseudolite 1 that has occurred between times $T_1$ and $T_2$.

The operator continues to perform measurements at a plurality of points $P_i$ with the phase measurement at any given point $P_i$ being as follows:

$$R_i = D_i + H_0 + \sum_{i=1}^{i} \Delta H_i$$

where $D_i$ is the phase corresponding to the distance between the receiver 2 at point $P_i$ and the pseudolite 1, and where $\Delta H_i$ is the relative slip between the clocks of the receiver 2 and of the pseudolite 1 that has occurred between $T_{i-1}$ and $T_i$.

The slip values $\Delta H_i$ are computed by the unit 4 by taking the difference between the slip $\Delta H_{i(2-5)}$ between the receiver 2 and the beacon 5 and the slip $\Delta H_{i(5-1)}$ between the beacon 5 and the pseudolite 1.

The slip value $\Delta H_{i(2-5)}$ is computed by the unit 4 and is a by-product of determining the coordinates of point $P_i$.

The second slip value ($\Delta H_{i(5-1)}$) can be determined by two ways :

if the correction beacon 5 is installed in sight of the pseudolite 1, a special channel can be allocated thereto in the same manner as channel allocation for the receiver 2, thereby enabling it to receive signals transmitted by the pseudolite 1. The distance between the beacon 5 and the pseudolite 1 being constant, the phase slip measured by the beacon 5 in the signal emitted by the pseudolite 1 corresponds to relative slip between the clocks of the beacon 5 and the pseudolite 1. This information is sent by the beacon 5 to the receiver 2 ;

if beacon 5 is out of sight of a pseudolite 1, the solution is to lock the slip of the clock of pseudolite 1 on the clock of the beacon 5. Thus, the values $\Delta H_{i(2-5)}$ are all equal to 0 and $\Delta H_{i(1-2)=\Delta Hi(1-5)}$.

Being in the vicinity of the mobile receiver 2, the pseudolite 1 receives the emitted signals of beacon 5 in the same way as the mobile receiver 2. Therefore, to lock the two clock slips on each other, one can modulate the carrier emitted by beacon 5 on a frequency which is a submultiple of its clock, the pseudolite 1 being provided with means for the receiving and the decoding of this information. The techniques for the locking of a clock on another by an hertzian link are well known from the man skilled in the art.

Each of the two here-above exposed solutions presents its own advantages. The first of these two solutions is rigorous but requires the setting of the beacon 5 in the sight of the pseudolite 1, which represents an operational constraint. With the second of these two solutions, the operator is not constraint, but the preciseness is slightly degradated, the degradation being function of the quality of the locking.

Whatever solution is chosen, the unit 4 stores the successive slip values $\Delta H_j$ and, for each point $P_i$ (ith point), it computes a phase value $R_i$ given by:

$$R'_i = R_i - \sum_{j=1}^{i} \Delta H_j$$

i.e.:

$$R'_i = D_i + H_0$$

This value $R'_i$ satisfies the following linear equation:

$$R'^2_i - R_0^2 + Ki = aiX + biY + ciZ + diH_0 \quad (1)$$

where:

ai, bi, ci, di and Ki are parameters computed by the unit 4 and which are a function of the coordinates of the points $P_i$ and $P_0$.

Between $T_i$ and $T_0$ the following applies:

$$D_i^2 - D_0^2 + X_0^2 - X_i^2 + Y_0^2 - Y_i^2 + Z_0^2 - Z_i^2 = 2(X_i - X_0)X + 2(Y_i - Y_0)Y + 2(Z_i - Z_0)Z$$

and the following also applies:

$$D_i^2 - D_0^2 = R'^2_i - 2H_0R'_i + H_0^2 - (R_0^2 - 2H_0R_0 + H_0^2)$$

$$= R'^2_i - R_0^2 - 2(R'_i - R_0)H_0$$

This is the same as equation (1) with ai, bi, ci, and di respectively equal to:

$$2(X_i - X_0), 2(Y_i - Y_0), 2(Z_i - Z_0), \text{ and } 2(R'_i - R_0)$$

Ki being equal to $X_0^2 - X_i^2 + Y_0^2 - Y_i^2 + Z_0^2 - Z_i^2$

As will be understood, equation (1) is a linear expression in X, Y, Z, and $H_0$ which can be solved once measurements are available for four points $P_i$ different from the point $P_0$.

In practice, the least squares method is used and a stability test is applied to the successively determined values X, Y, and Z for a single point P, with measurements stopping when the stability of the values for the coordinates X, Y, and Z is satisfactory.

For example, the solution obtained is accepted when the noise on the three unknowns X, Y, and Z is less than a threshold that is predetermined as a function of the accuracy required for the work to be performed (in practice 1 cm to a few cm).

The time required for convergence of the solution is a function of the observation geometry of the pseudolite and it lies in the range 1 minute to a few minutes.

As will have been understood, the method and the apparatus described above enable the position of a point where satellite signals cannot be received to be determined without using techniques other than those of radio localization.

All of the measurements are performed at a single point (i.e. the phase center of the antenna 3), thereby eliminating problems of matching measurements coming from different systems or sensors.

It will be observed that the processing described above is performed on the basis of observations concerning variation in the phase of received signals, and not on the phase proper of those signals, thereby eliminating problems associated with determining phase absolutely.

Operationally, the method and the system of the invention have numerous advantages.

The target point can be determined while the mobile receiver is moving freely, without any constraints on initial positioning or on relay points.

The coordinates of the target point can be determined simultaneously with measuring or fixing being performed conventionally at other points.

The method can be activated or interrupted without disturbing normal operation of real time kinematic observation of said points.

The connection between the pseudolite transmitter and the mobile receiver can be temporarily interrupted, e.g. by masking, without that having any consequence on the quality of the result.

The system accumulates and processes the time measurements required for obtaining a result in application of accuracy criteria which have previously been determined by the operator.

Once the required quality has been obtained, computation is terminated automatically and the operator is informed by the unit 4.

It may also be observed that the system proposed by the invention is very simple to handle: apart from installing the pseudolite transmitter, no other manipulation is required.

We claim:

1. A method of radio satellite localization of points on the surface of the earth to locate a masked point where a reception of signals transmitted by satellites is insufficient, the method comprising the steps of:

configuring an antenna of a radio localization mobile receiver to be freely movable in the vicinity of the masked point is positioned on a plurality of arbitrary points where the signals transmitted by the satellites are received satisfactorily;

placing a pseudolite transmitter at the masked point;

determining by radio localization at each of the arbitrary points where the mobile receiver antenna is successively positioned, coordinates of said arbitrary points, and measuring a phase of a pseudolite signal transmitted by the pseudolite transmitter and received at each of said arbitrary points by said antenna; and determining coordinates of the masked point as a function of said chase measurements and as a function of the coordinates of said arbitrary points.

2. A method according to claim 1, further comprising the steps of:

determining parameters of a linear equation relating to the coordinates of the masked point and a phase shift between the pseudolite transmitter and the radio localization mobile receiver at a reference time for each arbitrary point where the antenna is successively positioned, said parameters being a function of the phase measurement of the pseudolite signal and of the coordinates of said arbitrary points; and determining the coordinates of the masked point by solving a system of linear equations.

3. A method according to claim 2, wherein for an ith point where the antenna is successively positioned and i is an integer;

determining a relative phase slip $\Delta H_j$ of a clock of the pseudolite transmitter and a clock of the processing unit of the radio localization mobile receiver that occurs between said ith arbitrary point and the preceding (i-1)th arbitrary point is determined;

computing a following phase value:

$$R'_i = R_i - \sum_{j=1}^{i} \Delta H_j$$

where $R_i$ is the measured phase of the pseudolite signal at said ith arbitrary point, and relative slip values $\Delta H_j$ relating to preceding points having been stored for this purpose; and computing the parameters Ki, ai, bi, ci, and di of the following linear equation:

$$(1) R'^2_i - R_0^2 + Ki = aiX + biY + ciZ + diH_0$$

where X, Y, and Z are coordinates of the masked point, $H_0$ is a phase shift between the pseudolite transmitter and the radio localization mobile receiver at the reference time, ai, bi, ci and di are respectively equal to $2(X_{i-x0})$, $2(Y_{i-y0})$, $2(Z_{i-z0})$, and $2(R' i-R0)$, where $X_i$, $Y_i$, and $Z_i$ are coordinates of ith arbitrary point, $X_0$, $Y_0$, and $Z_0$ are coordinates of the arbitrary point where the antenna is located at the reference time, $R_0$ being the phase measurement of the pseudolite signal at the reference time, and where Ki is equal to $X_0^2 - X_i^2 + Y_0^2 - Y_i^2 + Z_0^2 - Z_i^2$.

4. A method according to claim 3, wherein determining the relative slip between the clocks of the pseudolite transmitter and of the processing unit of the radio localization mobile receiver is performed by taking the difference between:

a clock slip between said processing unit and a reference beacon; and a clock slip between said reference beacon and the pseudolite transmitter.

5. A method according to claim 4, wherein the clock slip is measured by the reference beacon and transmitted to the processing unit.

6. A method according to claim 4, wherein the clock slip is nullified by locking the pseudolite transmitter clock to the clock of the reference beacon, using a modulation of a carrier emitted by said reference beacon.

7. A method as defined in claims 1, 2, 3, 4, 5 or 6 further comprising the steps of:

performing a stability test on the successively determined values for the coordinates of the masked point, the stability test having a predetermined threshold that is a function of accuracy required for the successively determined values of the coordinates of said masked point; and said radio localization of the coordinates of said arbitrary points being terminated when the successively determined values of the coordinates of said masked point have reached the predetermined threshold.

8. Apparatus for radio satellite localization of points on a surface of the earth, the apparatus comprising:

a radio localization mobile receiver including both an antenna for receiving radio signals transmitted to the earth by a constellation of satellites, and a unit for processing said radio signals, a pseudolite transmitter a masked point where the reception of radio signals emitted by the satellites is unsatisfactory, one of the channels of the radio localization mobile receiver that is usually dedicated to receiving radio satellite signals being allocated to receiving a pseudolite signal transmitted by the pseudolite transmitter, processing means for enabling coordinates of the masked point to be determined as a function of a measured phase of the pseudolite signal transmitted by the pseudolite transmitter at various points where the antenna is successively positioned, and on the basis of the coordinates of said various points as determined by the unit.

9. Apparatus according to claim 8, wherein the processing means comprises:

computing means for determining, for each point of the various points at which the antenna is successively positioned, the parameters of a linear equation relating the coordinates of the masked point and a phase shift between the pseudolite transmitter and the radio localization mobile receiver with respect to a reference time, said parameters being a function of the measured phase of the pseudolite signal and of the coordinates of the various points; and computing means for solving the linear equations to determine the coordinates of the masked point.

10. Apparatus according to claim 9, further comprising:

means for determining the relative slip between a clock of the pseudolite transmitter and a clock of the unit of the radio localization mobile receiver between an ith point where the antenna is successively positioned and the preceding (i-1)th point;

means for computing the following phase value $$R'_i = R_i - \sum_{j=1}^{i} \Delta H_j$$

where $R_i$ is the measured phase of the pseudolite signal at said ith point with the value for relative slip relating to preceding points having been stored for this purpose; and means for computing parameters Ki, ai, bi, ci, and di for the following linear equation $$(1) R'^2_i - R_0^2 + K_i = aiX + biY + ciZ + diH_0$$

where X, Y, and Z are the coordinates of the masked point, $H_0$ is a phase shift between the pseudolite transmitter (1) and the radio localization mobile receiver at the reference time, ai, bi, ci and di are respectively equal to $2(X_i-X_0)$, $2(Y_i-Y_0)$, $2(Z_i-Z_0)$, and $2(R'_i-R_0)$, where $X_i$, $Y_i$, and $Z_i$ are the coordinates of ith point, $X_0$, $Y_0$, and $Z_0$ are the coordinates of the point where the antenna is located at the reference time, $R_0$ being the phase measurement of the pseudolite signal at the reference time, and where Ki is equal to $X_0^2 - X_i^2 + Y_0^2 - Y_i^2 + Z_i^2 - Z_i^2$.

11. Apparatus according to claim 10, wherein the means for determining relative slip between the clocks of the pseudolite transmitter and of the unit includes means for taking the difference between a clock slip between the unit and a reference beacon, and a clock slip between said reference beacon and the pseudolite transmitter.

12. Apparatus according to any one of the claims 8, 9, 10 or 11, further comprising:

means for testing the stability of the values successively determined for the coordinates of the masked point, the stability means having a predetermined threshold that is a function of accuracy required for the successively determined values of coordinates of the masked point; and said radio localization of the coordinates of points being terminated when the successively determined values of coordinates of the masked have reached the predetermined threshold.

* * * * *

UNITED STATES PATENT AND TRADEMARK OFFICE
CERTIFICATE OF CORRECTION

PATENT NO. : 5,757,314
DATED : May 26, 1998     PAGE 1 OF 2
INVENTOR(S) : Gounon et al.

It is certified that error appears in the above-identified patent and that said Letters Patent is hereby corrected as shown below:

In column 4 at line 50, please delete " A " and insert -- $\Delta$ --.

In column 6, claim 1 at line 60, please delete " chase " and insert -- phase --.

In column 7, claim 3 at line 26, please delete

" $(1) R'_i{}^2 - R_0{}^2 + K_i = a_i X = b_i Y + c_i Z + d_i H_0$ " and insert

-- $(1) R'i^2 - Ro^2 + Ki = aiX = biY + ciZ + diHo$ --.

In column 7, claim 3 at lines 32-33, please delete " $2(X_{i-xo})$, $2(Y_{i-yo})$, $2(Z_{i-zo})$, and $2(R'i-R0)$, " and insert -- $2(Xi-Xo)$, $2(Yi-Yo)$, $2(Zi-Zo)$, and $2(R'i-R0)$ --.

In column 7, claim 3 at line 34, please delete " $X_0$, $Y_0$, and $Z_0$ " and insert
-- Xo, Yo, and Zo --.

In column 7, claim 3 at line 36, please delete " $R_0$ " and insert -- Ro --.

In column 7, claim 3 at lines 38-39, please delete " $X_0{}^2 - X_i{}^2 + Y_0{}^2 - Y_i{}^2 + Z_0{}^2 - Z_i{}^2$ " and insert -- $Xo^2 - Xi^2 + Yo^2 - Yi^2 + Zo^2 - Zi^2$ --.

UNITED STATES PATENT AND TRADEMARK OFFICE
CERTIFICATE OF CORRECTION

PATENT NO. : 5,757,314
DATED : May 26, 1998
INVENTOR(S) : Gounon et al.

It is certified that error appears in the above-identified patent and that said Letters Patent is hereby corrected as shown below:

In column 8, claim 10 at line 53, please delete
" $(1)R'_i{}^2 - R_0{}^2 + K_i = aiX = biY + ciZ + diH_o$ " and insert
-- $(1)R'i^2 - Ro^2 + Ki = aiX = biY + ciZ + diHo$ --.

In column 8, claim 10 at lines 58-59, please delete -- $2(X_i - X_0)$, $2(Y_i - Y_0)$, $2(Z_i - Z_0)$, and $2(R'_i - R_0)$, " and insert -- $2(Xi-X0)$, $2(Yi-Y0)$, $2(Zi-Z0)$, and $2(R'i-R0)$ --.

In column 8, claim 10 at lines 60-61, please delete " $X_0$, $Y_0$, and $Z_0$ " and insert -- Xo, Yo, and Zo --.

In column 8, claim 10 at line 65, please delete " $X_0{}^2 - X_i{}^2 + Y_0{}^2 - Y_i{}^2 + Z_i{}^2 - Z_i{}^2$ " and insert -- $X0^2 - Xi^2 + Y0^2 - Yi^2 + Zi^2 - Zi^2$ --.

Signed and Sealed this

Fifteenth Day of June, 1999

*Attest:*

*Attesting Officer*

Q. TODD DICKINSON

*Acting Commissioner of Patents and Trademarks*